United States Patent [19]

Montague et al.

[11] Patent Number: 4,900,047
[45] Date of Patent: Feb. 13, 1990

[54] FOLDABLE BICYCLE

[76] Inventors: Harry Montague, 3042 Newark St. NW., Washington, D.C. 20008; David Montague, 87 Cowell St., Somerville, Mass. 02143

[21] Appl. No.: 263,946

[22] Filed: Oct. 28, 1988

[51] Int. Cl.⁴ ............................................. B62K 15/00
[52] U.S. Cl. ..................................... 280/278; 280/287
[58] Field of Search ................................ 280/278, 287

[56] References Cited

U.S. PATENT DOCUMENTS

| | | | |
|---|---|---|---|
| 569,354 | 10/1896 | Ryan | 280/287 |
| 599,016 | 2/1898 | Ryan | 280/287 |
| 3,015,498 | 1/1962 | Tanaka et al. | 280/278 |
| 4,448,437 | 5/1984 | Montague | 280/287 X |
| 4,579,360 | 4/1986 | Nishimura et al. | 280/278 |

Primary Examiner—John A. Pekar
Attorney, Agent, or Firm—Sughrue, Mion, Zinn, Macpeak & Seas

[57] ABSTRACT

A foldable bicycle with separate complete front and rear frames joined at the seat post by concentric frame members. An alignment mechanism automatically actuates as the frames are rotated into a frame open position. A binder bolt mechanism locks the frames open in a rigid orientation. The bicycle frame and components may be configured as a lightweight ten-speed bicycle or as an all terrain bicycle.

29 Claims, 2 Drawing Sheets

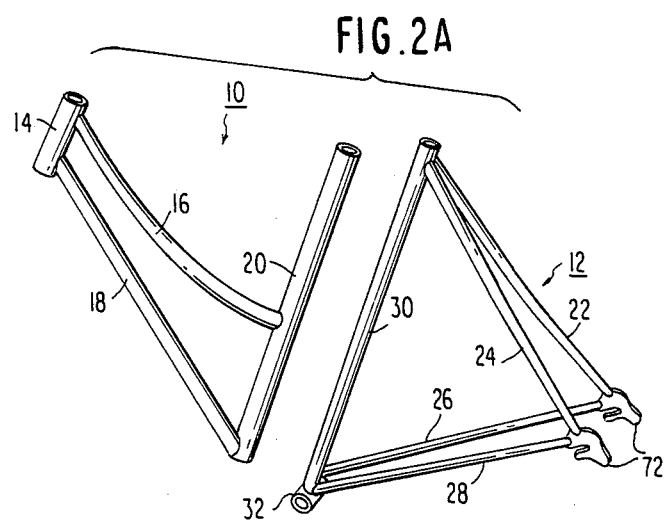
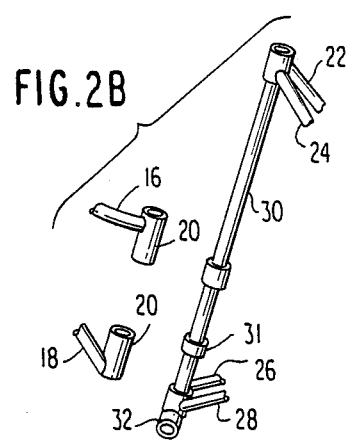
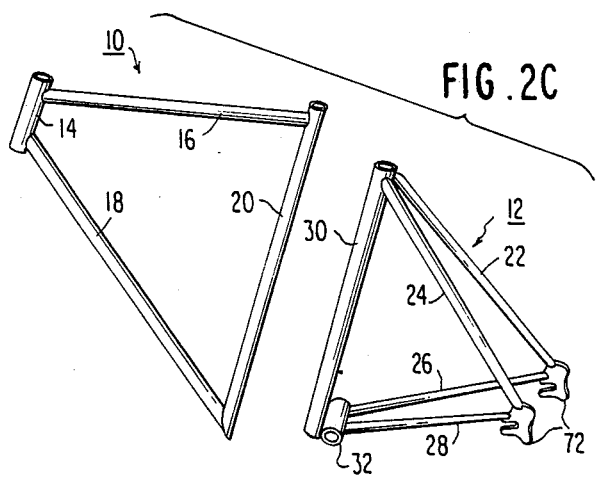
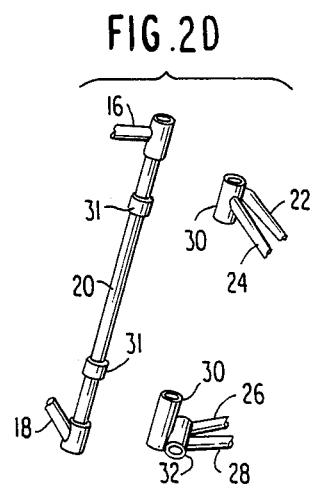
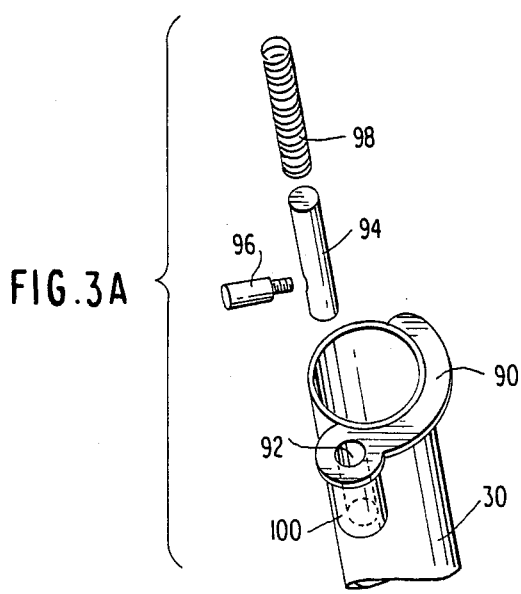
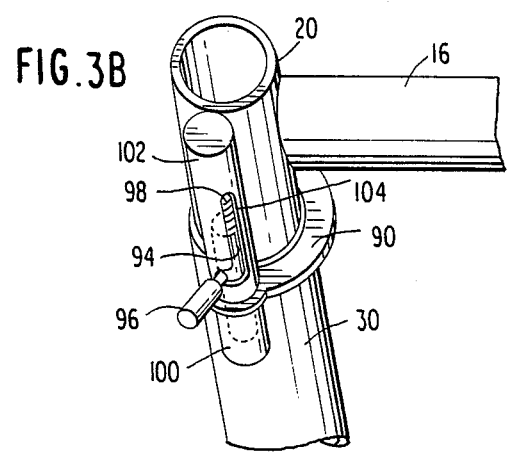

FOLDABLE BICYCLE

BACKGROUND OF THE INVENTION

1. Field Of The Invention

This invention relates to a collapsible bicycle. In particular, this invention relates to a bicycle having separate rigid main and rear frame members joined together by concentric members forming the seat tube and foldable thereabout.

2. Prior Art

Foldable bicycle technology is replete with a number of constructions attempting to accomplish folding operations yet provide satisfactory bicycle performance. Many of these prior art constructions are technically deficient, requiring difficult, time-consuming operations to collapse or assemble the bicycle or, not providing for adequate riding dynamics when operated. Additionally, given stringent safety requirements, the vast number of prior art proposals are unacceptable in the first as not satisfying contemporary safety rules. For example, many frames which are not permanent structurally integral members are deemed to have inadequate strength characteristics necessary for contemporary bicycle design. Frame systems shown in U.S. Pat. Nos. 607,325 and 640,680 are characteristic of a number of prior art frame members which are hinged, telescoping, and the like. While a reduction in size of the bicycle frame is effectuated by those techniques, it requires changes in the strength capacity of the individual frame elements and would not guarantee the fail safe design that is necessary for present day Government approval. In U.S. Pat. No. 607,325, the top tube is sleeved and joined by a collar a. The down tube D is hinged into two portions. Such constructions, while offering foldability, should the hinging or sleeving mechanism come loose the bike does not afford adequate frame rigidity and strength and would be dangerous.

One example of a foldable bicycle configuration having a rigid front frame is found in U.S. Pat. No. 4,022,485. In this prior art system, the collapsible bicycle includes a rigid main frame while having a collapsible rear frame which is hinged and foldable about a pin located at the pedal housing. However, the rear frame is not a rigid member but rather, a series of segments having pivoting portions to allow the rear frame elements to collapse into a storage position over the rigid main frame. Again, should the pin come loose, the bike would collapse.

Another prior art attempt at achieving a folding bicycle having relatively rigid main and rear frame members is found in U.S. Pat. No. 3,374,009. In this system, the rear frame elements comprising the seat tube 2, the chain stays 5, and the seat stays 7 form a rigid integral assembly. However, the down tube comprises two sections 14 and 15 hinged at a point of articulation 16. Hence, while the necessary structural strength required to support the seat is effectuated by a rigid rear frame member, inherent weakness in the front frame is apparent.

The prior art is however replete with a number of systems having rigid front and rear frames which are foldable to achieve a portable bicycle configuration. Typical of these devices are U.S. Pat. Nos. 3,710,883, 4,067,589 and French Patent No. 84,291. While portability is achieved, these systems suffer from other defects. First the number of frame elements is complicated, the locking mechanisms difficult to work, and, most importantly, the bicycles when assembled do not offer satisfactory performance. The hallmark characteristics of all satisfactory foldable bicycle configurations currently in existence is the use of small wheels coupled with high frame weight. The use of such wheels increases the rolling friction, alters the center of gravity of the bicycle, and therefore, does not afford to the user those riding characteristics of a large bike which are required. This inadequacy is made more conspicuous by the frame weight that hinders riding dynamics. As noted in "Better Bikes", Cuthbertson, Ten Speed Press (1980) these folding bikes have poor riding characteristics. The advent of lightweight 10-speed bicycles utilizing full size, typically 27 inch wheels provides a model for an acceptable folding bicycle configuration that should attempt to use those same standard components yet at the same time reduce weight.

The use of standard components, such as full size wheels, brake assemblies, gear chain mechanisms and the like, reduces costs and increases serviceability of the bicycle by relying solely on commercially available components. Secondly, a standing requirements exists in this field for the reduction of weight of the bicycle frame itself. In addition to reducing the overall size of the bicycle, portability implies the ability to easily transport the bicycle in a folded condition. Hence, even if folded, the bicycle should form a "package" that can be conveniently handled. In an extreme example, backpacking, a folded bicycle should be within a weight range to allow transportation on the back of a person. Such a bicycle was first defined in the technology in U.S. Pat. No. 4,448,437. The bicycle offered portability during travel in cars, boats, trains, airlines or the like, the bicycle was not only compact in size but easily handled in terms not having projecting parts, and generally shielding the gear mechanism. However, this device was evolutionary in that further improvements were needed. For example, the technique of positive locking yet providing ease of operation is a standing requirement.

Accordingly, there still exists in this technology a need for a foldable bicycle, one using standard components, one satisfying the existing safety requirements needed for commercial manufacturing, yet achieving the necessary performance characteristics attained in conventional lightweight and all terrain bicycles.

SUMMARY OF THE INVENTION

Given the deficiencies in the prior art, it is an object of this invention to define a foldable bicycle that is lightweight, has the necessary strength characteristics, and provides riding performance commensurate with contemporary fixed frame bicycle designs.

Yet another object of this invention is to define a folding bicycle which may be reduced in size to allow for easy transportation by carrying or using a single wheel for support.

Still another object of this invention is to define a folding bicycle which in its folding configuration allows backpacking yet not interfering with the walking motion of the user.

A further object of this invention is to define a folding bicycle design meeting contemporary safety requirements.

A still further object of this invention is to provide a bicycle that may be marketed economically and serviced utilizing standard components.

These and other objects of this invention are achieved in a folding bicycle design utilizing rigid frame elements that fold around the seat tube formed from concentric elements and not at some outside structurally unrelated point to the bicycle design. As elaborated herein, conventional folding bicycles require additional stress points which must be overcome by having additional framing elements to provide the necessary structural integrity. In accordance with the present invention, both the stress of the beam action locks the device and the two frames clamped together are stressed as a unitary frame. The bicycle frame in accordance with the present invention is made up of two interlocking frames, one formed by the top, down, head and seat tubes and the other formed by the seat and chain stays and the seat tube. Each of the frame elements is complete and/or acts as a complete element being structurally integral. The seat tube is made up of two full length concentric posts or to save weight one full length post and one partial length post collared to the full length post. The collared construction does not weaken the bicycles resistance to vertical loads. The one complete and one partial frame forms as strong a total frame as if two separate and complete frames were used. A third post of seat post slides into the other two.

This hallmark characteristic of the present invention defines two distinct embodiments. In the first embodiment, the front frame is smaller than the back at a point where it joins the seat tube and forms the outside concentric ring of the seat tube. In these embodiments, the down tube of the bicycle is joined to the outer ring a few inches above the pedal housing and the top tube (as in a woman's bicycle) is placed well below the joining of the seat stays and the seat posts so as to hit the seat stays as late as possible as the bicycle is folded. These seat stays are placed close together or splayed inward to further delay this contact. In the two possible embodiments shown, each has two species; the first with two complete frames and the second with the larger of the frames being complete and the other frame collared to it. The second specie is a lighter but functionally and structurally equal construction.

In a second embodiment, the front frame is larger than the back frame at a point where it joins the seat tube and forms the inner concentric ring of the seat tube. Because in traditional bike design, the front half of the frame is always larger than the rear half, this embodiment is the normal mode of construction of the folding parts. As a result, the front half can be folded geometrically around the back half. In this embodiment, the bottom bracket or pedal housing may be almost in the traditional position at the intersection of the chain stays, seat and down tubes but slightly to the rear. It is offset and raised just enough so that the pedal bracket shaft misses the down tube when folded. Again, both the complete frame and the collared frame embodiments are shown. In accordance with the present invention, standard derailleur mechanisms and control levers are utilized. A modification in the position of the front derailleur chain shifter is required for the second embodiment where the chain wheel is off center to the seat post. The front and rear derailleur cables run down the down tube and are tightly guided around the bottom of the seat tube then onto their respected derailleurs.

Moreover, in accordance with the present invention, the folding process is achieved expeditiously without the requirement of having to utilize a large number of tools or to materially disassemble the bicycle. Rather, such traditional steps of removal of the front wheel, moving the seat post stem downward are accomplished, then with the release of only a bolt lever and the two binding quick releases, the frame folds. In a folded position, the approximate size of the bicycle is determined by the wheel size in the height direction and by the wheel size plus the wheel chain projection in the length direction and the handle bar projection. In such a folded position, the bicycle can easily fit into the trunk space in small size cars, conforms to airplane travel requirements, may be carried aboard elevators, and generally carried in one hand as is a suitcase. The bicycle may also be rolled along on one wheel as a suitcase on wheels.

Another advantage of the bicycle in its folded position is that it can be carried in a traditional backpack manner. In this mode, the front frame acts as a frame in a backpack, with the length being scaled identically to that of an adult. The frame in the folded position is configured to be symmetrically balanced around the center of the backpack person. Standard accessories to achieve backpack portability of the folded bicycle in accordance with the present invention are used, such as padded shoulder straps, a back band, hip belt and eyelets to attach peripheral equipment.

This invention will be described in greater detail by referring to the attached drawings and the description of the preferred embodiment which follows.

BRIEF DESCRIPTION OF THE DRAWING

FIGS. 2A and 2B are schematic side views showing a first embodiment of the frames utilized in accordance with the present invention for a woman's bicycle where the rear frame is solid and the larger of the frames:

FIGS. 2C and 2D are schematic side views showing a second embodiment of the frames in accordance with this invention where the front frame is solid and the larger of the frames: and FIG. 3A and 3B are perspective views illustrating operation of the alignment pin.

DESCRIPTION OF THE PREFERRED EMBODIMENT

Figure 1:
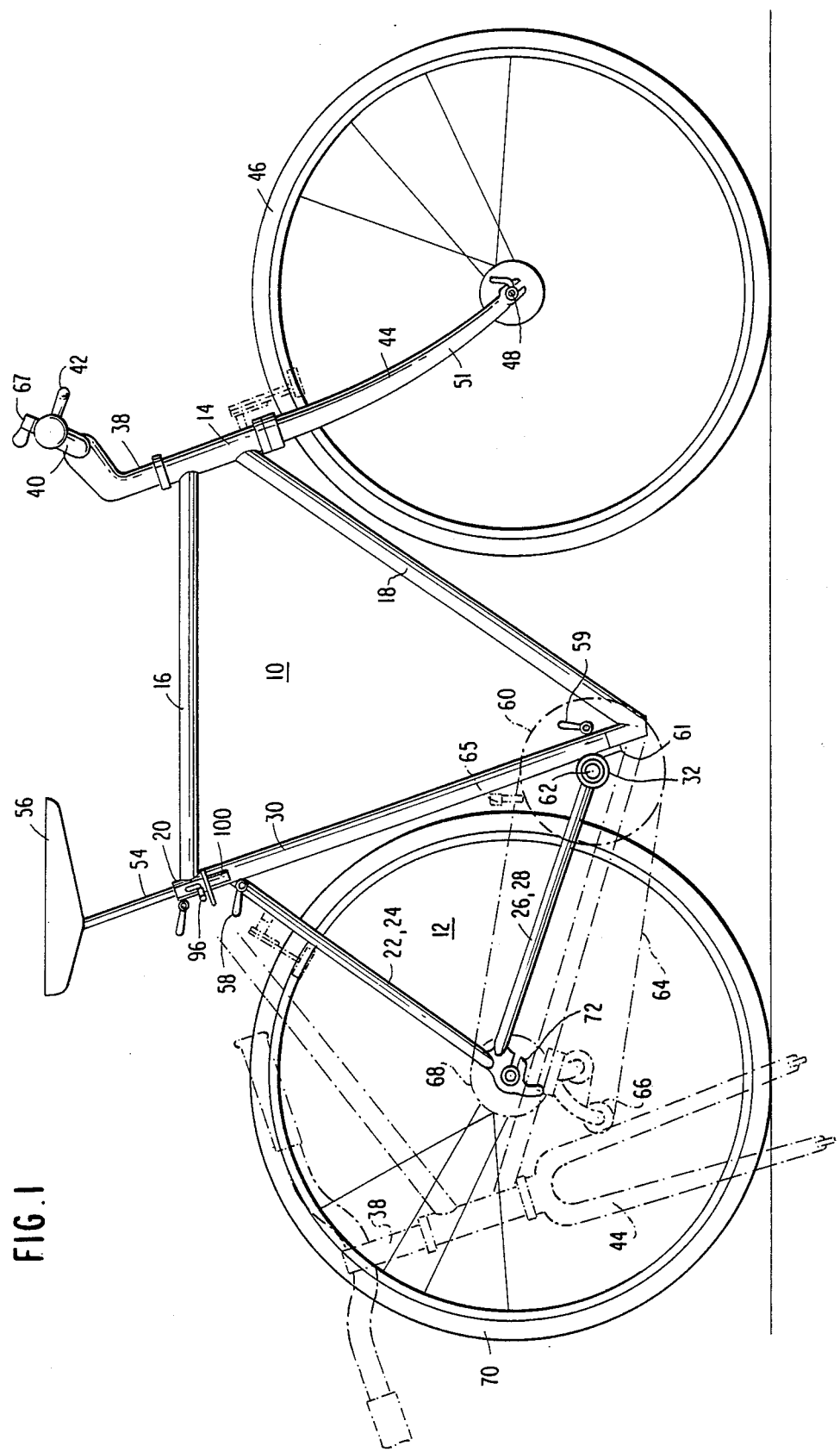
FIG. 1 is side elevation view of the folding bicycle in accordance with the present invention.

Referring now to FIGS. 1, 2 and 3, the preferred embodiments of this invention is shown. FIGS. 2A, 2B, 2C and 2D show the fundamental alternative rigid frame configurations used in accordance with the present invention. FIG. 3A and 3B illustrate the operation of the alignment pin. In FIGS. 2A and 2B, the front frame member 10 is positioned away from the rear frame member 12. In FIGS. 2C and 2D, the front frame member 10 clears over the top of the rear frame member 12 when folded. An important characteristic of both embodiments is the concentric nature of the seat tubes used to interlock the two frame members. In FIGS. 2A, 2B, 2C and 2D, the front frame member 10 comprises a head tube 14, a top tube 16, a down tube 18, and a seat tube component 20. These elements are constructed utilizing conventional bicycle technology by welding tubular elements to form a rigid construction. In FIGS. 2B and 2D components 20 and 30 are collared into complete continuous components. The collar elements 31 are stops for the partial frame elements locking their vertical position on the continuous frame.

The rear assembly 12 comprises a pair of seat stays 22, 24 and chain stays 26 and 28. The two sets of seat and chain stays are welded to the tube seat 30 and pedal housing. In the first embodiment, the pedal housing 32 is dropped below the seat tube in a conventional manner. In accordance with this invention, the seat tube 30 is placed concentrically inside the seat tube 20 so that rotation between the front and rear frame members can take place during the folding operation. The seat and chain stays are then welded into place to complete the assembly. The concentric seat tubes are held in rigid position utilizing alignment pins, blocks and quick release binder bolts, the like positioned on the upper and lower portions of the seat tube. It is understood that a third concentric tube, namely, the seat post will be mounted inside the two seat tubes.

In an opened, operable position, the two seat tubes are held rigidly together by quick release binder bolts and alignment pins, blocks or the like. The bicycle is configured to fold in only one direction from the straight position, metal blocks, not shown, being set on the alignment pins.

The second embodiment of this invention, shown in FIGS. 2C and 2D, utilize the same fundamental elements for the front frame 10. The fundamental distinction between the embodiment of FIGS. 2C and 2D, vis-a-vis that of FIGS. 2A and 2B, is that the seat post member 20 in the embodiment of FIGS. 2C and 2D is inside and longer so that the front frame 10 is larger than the rear frame 12. The rear frame is modified from that shown in FIGS. 2A, 2B in two respects. First, the pedal housing 32 is moved from the position downwardly extending from the seat tube to a point on the back side of the seat tube so that the pedal shaft bypasses the seat tube.

FIG. 1 shows the complete bicycle assembly which, apart from the two frame members, utilizes completely standard components. The embodiment of FIG. 1 is constructed in a manner consistent with the frame assembly shown in FIG. 2C. That is, the same front frame member 10 is shown comprising a head tube 14, a top tube 16, a down tube 18, and a seat tube 20.

As is standard in conventional bicycle frames, the head tube 14 houses a concentric internal handle bar stem 38. The stem 38 is locked in position. A binder bolt not illustrated, can be used on the handle bar stem for raised BMX handle bars or dropped touring bars when the handle bars have to be adjusted for compact folding. Conventional A.T.B. or city bicycles utilize handle bar members 40 having attached brake handles 42. It is understood, that although not shown in FIG. 1, the brake handles 42 will have associated therewith operative cabling and brake members disposed relative to the front and rear wheel frames.

The handle bar stem 38 fits concentrically in the head tube 14 having a pair of forks 44 to mount a conventional full size front wheel 46. Attachment of the front wheel 46 to the forks 44 is by any conventional quick release mechanism associated with the wheel axle 48. Accordingly, the steering mechanism of the bicycle in accordance with the present invention comprising the head tube 14, the concentric handle bar stem 38, handle bars 40, forks 44, front wheel 46, and front wheel axle 48 are all standard items in lightweight and all terrain full size bicycle design. In that sense, it is recognized that the handle bar stem 38 is movable within the head tube 14 so that handle bar adjustment upward or downward may be effectuated. This would be necessary only in a small size 20-inch wheel model.

The rear frame member 12 comprises a pair of seat stays 22, 24 and a pair of chain stays 26, 28 with the seat tube 30 disposed concentrically outside the inner seat tube 20 of the front frame member. A seat post 54 forms a third element of the bicycle seat post assembly with the seat 56 attached thereto in a conventional manner. A quick release binder 58, 59, the alignment block 61, and the alignment pin 96 locks and aligns the seat post members together in a rigid configuration when the bicycle is open. Details of the safety alignment pin are shown in FIG. 3 as a cut away position.

Referring specifically to FIG. 3A and 3B, FIG. 3A illustrates the alignment components in an exploded view while FIG. 3B illustrates the assembled configuration in a locked position. The seat tube 30 has an annular track 90 and has an opening 92 coincident with housing 100 on its outer surface. The track runs about one-half way around the tube. An alignment pin 94 having a handle 96 is biased by a compression spring 98 downward in a cylinder housing 100. The housing 100 is mounted to the seat tube 30. As upper housing portion 102 is positioned on the seat tube component 20 of the front frame 10. A guide slot 104 is provided for the handle 96 coming down and to the back to position 96 out of the way when the bicycle is open. As illustrated the handle 96 is screwed into the pin 94. FIG. 3B illustrated the assembled components with the frame in an open locked position. The housing portions 100 and 102 are aligned and the pin 94 locked.

The pedal housing 32 is cut around and attached to the seat tube 30 connected to the chain stays 26, 28 locking the housing in place. As shown in FIG. 1, continuous weld points exist between the circular cut pedal housing 32 and the seat tube 30, the chain stays 26, 28. In the embodiment of FIG. 1, the pedal housing is positioned only 1⅛" to the rear center of the seat tube, so as in non-folding bicycles the normal orientation of the pedals relative to the seat 56 is enhanced for the traditional power geometry of the bicycle.

The drive train mechanism of the bicycle in accordance with this invention utilizes standard components found in full sized 5- to 18-speed bicycles. That is, a large drive sprocket assembly 60 typically concentric sprocket gears of different diameter is mounted on a pedal shaft 62 with pedals, not shown, extending outwardly therefrom. A drive chain 64 is threaded through front derailleur 65 and rear derailleur mechanism 66 and drives a gear cluster 68 in a usual manner. Accordingly, in all respects, the drive mechanism of the embodiment shown in FIG. 1 corresponds to conventionally used components in standard bicycle assemblies. It is also noted that during the folding of the bicycle, none of the hear mechanisms are in any way affected by that operation. The mechanisms are also shielded when the bicycle is folded, protecting them and minimizing the transfer of lubricants.

In accordance with a preferred embodiment of this invention, the gear handle 67 to operate the derailleur 66 is shown on the handle bars 40. Typically, two such gear levers are used for a 10 to 18 speed bicycle with each lever straddling the top handle bar 40. The control cables run rearward along the bottom of tube 18 then around the bottom tube seat until they reach the front and rear derailleur mechanism. In the embodiment of FIG. 2D, tube 30 extends up high enough to hold the front derailleur.

In a conventional manner, a rear wheel 70 is attached to the dropouts 72 associated with the inner section of the seat stays and the chain stays. The mounting of the rear wheel 70 is done in a manner conventional in such lightweight bicycle construction. Accordingly, with the exception of the novel configurations of the front and rear frame members 10 and 12 and the positioning of the pedal housing, the bicycle in accordance with the invention utilizes standard components.

Referring now to the phantom line portion of FIG. 1, the folding operation in accordance with the present invention will be discussed. The first step is the removal of the front wheel utilizing the quick release mechanism associated with the dropouts at the front wheel hub 48.

The handle bars are wedged in between the front and rear frames in the folded position. It is recognized, then, that the total lateral area of the folded bicycle is determined approximately by the wheel size in the height direction (assuming the seat is removed) and by the handle bars plus the large sprocket 60 projection in the length direction. Hence, for a standard 27-inch wheel, the dimensions of the folded bicycle are approximately 27 inches high by 36 inches long.

The embodiment of FIG. 1 is also applicable to so called "mini bikes". For a 20-inch wheel, the folded size would be approximately 20 inches high by 30 inches long or, generally, the size of a large suitcase. The only changes necessary to convert this embodiment to "mini bike" size, would be first the use of a longer telescoping seat post to compensate for the lower elongated frame and duel telescoping handle bar stem such as used in motorcycle construction where the longer handle bar stem posts can be pushed down into the front forks 44 when the bicycle is in the folded position. Binder bolts same as 58 and 59 would be used to lock the duel handle bar stems in the raised riding position. In this configuration, the bicycle will fit into a trunk and since it is a smaller size, is compatible for carrying perfect for backpacking on airplanes, metros, elevators or the like. It can therefore be transported with no more difficulty than an ordinary suitcase. If desired, all the accessories for backpacking can be added and a handle for carrying purposes can be attached to the top tube 16.

The binder quick releases 58 and 59 are loosened then the person folding the bicycle positions himself on the chain wheel side of the bicycle, sets the non-chain wheel pedal arm in vertical position, steadies the back wheel by placing his foot behind it so it won't roll backwards and at the same time tilts the bicycle so the front section 10 is vertically over the rear section 12. The front handle bar and fork assembly are turned 90° away from chain wheel side, and the alignment pin 94 is pulled up and disengaged.

Specifically, to release, the handle 96 is turned counter-clockwise and lifted, compressing spring 98. When the bottom of pin 94 clears the track 90 the rear frame may be rotated. As the frame is being folded the pin 94 rides on track 90. By this technique the pin is held retracted. When the frame is unfolded, rotation of the frames occurs and when the pin 94 riding on track 90 reaches hole 92 the spring 98 pushes it into housing 100. The rider then knows that the frames are locked and approximately aligned and the pin is rotated by handle 96 into a locked position. This technique offers a significant improvement over prior mechanisms where first a degree of "hunting" was required to determine the aligned position for the frames and there was no automatic safety feature that permits the bicycle to be safely ridden, while it alerts the rider that he has not finished his job of securing the frames. It avoids the all or nothing hazard of depending on the rider to do what he is supposed to do. With the rider now mounted on the bicycle, he will feel some play in the alignment of the front and back frames alerting him that the final alignment pushing the frames against the alignment blocks has not been done and the binder bolts have not been secured. The front frame 10 rotates (helped by its own weight) down and around to the rear frame 12 stopping when the rear tire 70 hits the front frame members 18, 16 and the handlebar 40. Obviously, the bicycle can be folded while in the horizontal position, but the tipping up method has been found to be much the easiest.

Accordingly, the present invention, a full size lightweight or ATB bicycle meets all existing safety criteria. The bicycle comprises in its basic form rigid frames which are interconnected in a concentric manner. The bicycle components comprising the drive system, brakes, wheel, handle bars, seat assembly and the like are all conventional components. The bicycle, however, in the folded condition offers unique portability and backpacking capability. Being capable of utilizing full size 27-inch wheels, performance comparable to existing lightweight or ATB bicycles is assured. Moreover, because the requirement for additional frame members is minimized, overall weight of the bicycle remains commensurate with that of traditional rigid design, adding about only one pound of weight.

While the preferred embodiment of FIG. 1 is shown having the front frame 10 larger than the rear frame 12, as discussed with respect to FIGS. 2C and 2D, the alternative construction of utilizing a larger rear frame can be accomplished within the scope of this invention. In accordance with the embodiment of FIGS. 2A and 2B, identical elements are used as in the case of the FIGS. 2C and 2D embodiment with the exception that the down tube 18 joins the outer ring 20 of the front frame a few inches above the pedal housing 32. The top can be straight or curved as in a woman's bicycle and is positioned as far below the seat stays 22 and 24 as possible, when the bicycle is folded. These seat stays are bent in tight to the wheel so that when stay 24 comes around and hits top tube 16 the bicycle will have been folded as tightly as possible. This is shown in FIG. 2A. The folded woman's bicycle can be used with 24-inch wheels to achieve a very compact fold. It can also be used with an optional small powered supplemental gasoline engine. These engines mount onto the chain stays up to just in back of the crank housing or just in front of the rear axle depending on the model of engine and power the rear tire. The independent engines come with pedal arm outward extenders to the pedal arms do not hit the engine as they swing to the back.

It is noted that additional modifications of this invention can be accomplished without departing from the essential scope thereof.

I claim:
1. A foldable bicycle frame comprising:
   a complete closed front frame having a first hollow member to accommodate a seat post,
   a complete rear frame having a second hollow member to accommodate said seat post, said first and second hollow members being concentric to define a joining section, whereby said front and rear frames are foldable about said hollow members,
   a means to automatically align said first and second hollow members comprising a spring biased alignment member to secure said front and rear frames members in an open position, a housing located on said joining section, said housing containing said alignment member and a track mounted on one of said concentric members to provide a guide for said alignment member and, means to lock said first and second members into a rigid orientation.

2. The apparatus of claim 1 wherein said first member is associated with said front frame and is concentric inside said second member associated with said rear frame.

3. The apparatus of claim 1 wherein said first member is associated with said front frame and is concentric outside said second member associated with said rear frame.

4. The apparatus of claim 1 wherein said rear frame comprises a pair of seat stays and a pair of chain stays joined at drop outs for a rear wheel that is mounted therebetween and, said second member joining said seat and chain stays to form a rigid rear frame and a pedal housing positioned between said second member and said chain stays and secured thereto.

5. The apparatus of claim 1 further comprising a pedal housing cut away and mounted onto a seat tube to permit a pedal crank shaft to bypass said seat tube.

6. The apparatus of claim 1 further comprising a pedal housing mounted on the end of the concentric member forming a portion of said rear frame.

7. The apparatus of claim 1 wherein said means to secure said front and rear frames comprises a binder bolt compressing said first and second members together, said binder bolt defining a monolithic frame.

8. The apparatus of claim 1 further comprising a front wheel detachably mounted to said front frame, a rear wheel mounted on said rear frame, means to attach said front wheel to said rear frame where said bicycle is folded, a gear mechanism having operative levers attached to said front frame and, a steering yoke rotatably mounted on said front frame.

9. A foldable bicycle frame comprising:
a complete closed front frame, a complete rear frame, means defining a joining section for said front and rear frames comprising, members of said complete closed front frame and said rigid rear frame defining a pair of concentric mutually rotatable members, a first of said members comprising a seat tube of said front frame and a second of said members comprising a seat tube of said rear frame, and means automatically aligned with said concentric mutually rotatable members, whereby said rotatable members are aligned in an open position of said frame, said means automatically aligned comprises members in an open position, a housing located on said joining section, said housing containing said alignment member, and guide means on one of said concentric members to provide a guide for said alignment member.

10. The apparatus of claim 9, wherein said first member is associated with said front frame and is concentric inside said second member associated with said rear frame.

11. The apparatus of claim 9, wherein said first member is associated with said front frame and is concentric outside said second member associated with said rear frame.

12. The apparatus of claim 9, wherein said rear frame comprises a pair of seat stays and a pair of chain stays joined at drop outs for a rear wheel that is mounted therebetween and, said second member joining said seat and chain stays to form a rigid rear frame and, a pedal housing positioned between said second member and said chain stays and secured thereto.

13. The apparatus of claim 9 further comprising a pedal housing cut away and mounted onto a seat tube to permit a pedal crank shaft to bypass said seat tube.

14. The apparatus of claim 9 further comprising a pedal housing mounted on the end of the concentric member forming a portion of said rear frame.

15. The apparatus of claim 9 further comprising a front wheel detachably mounted to said front frame, a rear wheel mounted on said rear frame, means to attach said front wheel to said rear frame where said bicycle is folded, a gear mechanism having operative levers attached to said front frame and, a steering yoke rotatably mounted on said front frame.

16. A foldable bicycle frame comprising:
a complete closed front frame and a separate complete rear frame, both said complete closed front and complete rear frames being rigid continuous frames,
a joining section defined by seat tubes of said front and rear frames wherein said seat tubes form a pair of concentric mutually rotatable members, and
means to automatically align said rotatable members and when released allowing said front and rear frames to fold about said concentric members comprising a spring biased alignment member to secure said front and rear frames members in an open position, a housing located on said joining section, said housing containing said alignment member and a track mounted on one of said concentric members to provide a guide for said alignment member.

17. The apparatus of claim 16, wherein said first member is associated with said front frame and is concentric inside said second member associated with said rear frame.

18. The apparatus of claim 16, wherein said first member is associated with said front frame and is concentric outside said second member associated with said rear frame.

19. The apparatus of claim 16, wherein said rear frame comprises a pair of seat stays and a pair of chain stays joined at drop outs for a rear wheel that is mounted therebetween and, said second member joining said seat and chain stays to form a rigid rear frame and, a pedal housing positioned between said second member and said chain stays and secured thereto.

20. The apparatus of claim 16 further comprising a pedal housing cut away and mounted onto a seat tube to permit a pedal crank shaft to bypass said seat tube.

21. The apparatus of claim 16 further comprising a pedal housing mounted on the end of the concentric member forming a portion of said rear frame.

22. The apparatus of claim 16 further comprising a front wheel detachably mounted to said front frame, a rear wheel mounted on said rear frame, means to attach said front wheel to said rear frame where said bicycle is folded, a gear mechanism having operative levers attached to said front frame and, a steering yoke rotatably mounted on said front frame.

23. A foldable bicycle comprising:
a complete closed front frame, a separate complete rear frame, said front and rear frames being continuous and rigid, a seat post, means for holding said seat post formed by first and second tubular members of said front and rear frames defining concentric members at a joining section wherein said front and rear frames are foldable about said concentric joining section, means automatically aligned with said concentric joining section to align said first and second tubular members and means to lock said first and second tubular members in a fixed orientation, said means automatically aligned comprises members in an open position, a housing located on said joining section, said housing containing said alignment member, and guide means on one of said concentric members to provide a guide for said alignment member.

24. The apparatus of claim 23, wherein said first member is associated with said front frame and is concentric inside said second member associated with said rear frame.

25. The apparatus of claim 23, wherein said first member is associated with said front frame and is concentric outside said second member associated with said rear frame.

26. The apparatus of claim 23, wherein said rear frames comprises a pair of seat stays and a pair of chain stays joined at drop outs for a rear wheel that is mounted therebetween and, said second member joining said seat and chain stays to form a rigid rear frame and, a pedal housing positioned between said second member and said chain stays and secured thereto.

27. The apparatus of claim 23 further comprising a pedal housing cut away and mounted onto a seat tube to permit a pedal crank shaft to bypass said seat tube.

28. The apparatus of claim 23, wherein said means to secure said front and rear frames comprises a binder bolt compressing said first and second members together, said binder bolt defining a monolithic frame.

29. The apparatus of claim 23 further comprising a front wheel detachably mounted to said front frame, a rear wheel mounted on said rear frame, means to attach said front wheel to said rear frame where said bicycle is folded, a gear mechanism having operative levers attached to said front frame and, a steering yoke rotatably mounted on said front frame.

* * * * *